(12) United States Patent
Shah et al.

(10) Patent No.: US 12,103,509 B2
(45) Date of Patent: Oct. 1, 2024

(54) TRACKING HYDRAULIC PRESSURE SUPPORT EVENTS IN A VEHICLE

(71) Applicant: Robert Bosch GmbH, Stuttgart (DE)

(72) Inventors: Ankit R. Shah, Canton, MI (US); Anthony J. Farrell, Brooklyn, MI (US); Erica R. Hingst, Plymouth, MI (US)

(73) Assignee: Robert Bosch GmbH, Stuttgart (DE)

(*) Notice: Subject to any disclaimer, the term of this patent is extended or adjusted under 35 U.S.C. 154(b) by 397 days.

(21) Appl. No.: 17/345,696

(22) Filed: Aug. 18, 2021

(65) Prior Publication Data

US 2021/0402965 A1 Dec. 30, 2021

(51) Int. Cl.
| | | |
|---|---|---|
| *B60T 8/171* | (2006.01) | |
| *B60K 35/00* | (2024.01) | |
| *B60K 35/28* | (2024.01) | |
| *B60T 1/00* | (2006.01) | |

(Continued)

(52) U.S. Cl.
CPC .............. *B60T 8/171* (2013.01); *B60K 35/00* (2013.01); *B60T 1/005* (2013.01); *B60T 13/16* (2013.01); *G07C 5/085* (2013.01); *B60K 35/28* (2024.01); *B60K 2360/178* (2024.01)

(58) Field of Classification Search
CPC .......... B60T 8/171; B60T 1/005; B60T 13/16; B60K 35/00; B60K 2370/178; G07C 5/085
See application file for complete search history.

(56) References Cited

U.S. PATENT DOCUMENTS

| | | | | |
|---|---|---|---|---|
| 2009/0204302 A1* | 8/2009 | Kondo | .................. | B60T 11/046 701/70 |
| 2011/0270500 A1* | 11/2011 | Ummer | .................. | B60T 13/662 701/70 |

(Continued)

FOREIGN PATENT DOCUMENTS

DE 102018205829 A1 * 10/2018

OTHER PUBLICATIONS

Machine Translation of DE-102018205829-A1 PDF File Name: "DE102018205829A1_Machine_Translation.pdf".*

*Primary Examiner* — Grant Moubry
*Assistant Examiner* — Ruben Picon-Feliciano
(74) *Attorney, Agent, or Firm* — Michael Best & Friedrich LLP

(57) ABSTRACT

Notifying a driver of a number of hydraulic pressure support events. In one example, a system includes a parking brake assembly; a human-machine interface; and a parking brake electronic processor configured to generate a command to apply one or more braking components of the parking brake assembly to at least one wheel of the vehicle and generate a request for additional hydraulic pressure support. The system also includes a host electronic processor configured to receive the request for additional hydraulic pressure support; generate a command to build extra hydraulic pressure; and provide the command to the pump motor. The host electronic processor is also configured to increment a counter indicating a number of hydraulic pressure support events performed; compare the counter to a threshold value; and provide an alert to the driver via the human-machine interface when the counter exceeds the threshold value.

20 Claims, 3 Drawing Sheets

(51) Int. Cl.
*B60T 13/16* (2006.01)
*G07C 5/08* (2006.01)

(56) References Cited

U.S. PATENT DOCUMENTS

2018/0162339 A1* 6/2018 Irwan ..................... B60T 8/00
2018/0162342 A1* 6/2018 Schmidt-Harms .... B60T 17/221

* cited by examiner

TRACKING HYDRAULIC PRESSURE SUPPORT EVENTS IN A VEHICLE

BACKGROUND

In current electronic power braking systems, parking braking system controllers (e.g., controllers actuating parking brake components) may request additional hydraulic pressure support from a braking system controller to increase clamping force on wheels of the vehicle. With the development of new systems, automated parking brake sizes are being reduced to improve fuel mileage, which will require more hydraulic pressure support. Furthermore, autonomous parking relies on hydraulic pressure support as a safety feature to ensure the vehicle is secured when no driver is present.

Current standards limit the number of hydraulic pressure support events to one thousand total events and do not include requirements or guidelines for calculating the number of hydraulic pressure support events or proceeding once the maximum event limit is reached.

SUMMARY

Therefore, a system is needed to track the number of hydraulic pressure support events being requested and, when certain thresholds are hit, provide a notification that indicates that the thresholds have been met.

One embodiment provides a system for notifying a driver of a number of hydraulic pressure support events. The system includes a parking brake assembly; a human-machine interface; and a parking brake electronic processor. The parking brake electronic processor is configured to generate a command to apply one or more braking components of the parking brake assembly to at least one wheel of the vehicle and generate a request for additional hydraulic pressure support. The system also includes a host electronic processor configured to receive the request for additional hydraulic pressure support from the parking brake electronic processor; generate a command to build extra hydraulic pressure at the at least one wheel using a pump motor of a braking system of the vehicle; and provide the command to the pump motor. The host electronic processor is also configured to increment a counter indicating a number of hydraulic pressure support events performed; compare the counter to a threshold value; and provide an alert to the driver via the human-machine interface when the counter exceeds the threshold value.

These and other features, aspects, and advantages will be apparent from a reading of the following detailed description and a review of the associated drawings. It is to be understood that both the foregoing general description and the following detailed description are explanatory and do not restrict aspects as claimed.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by, for example, executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1:
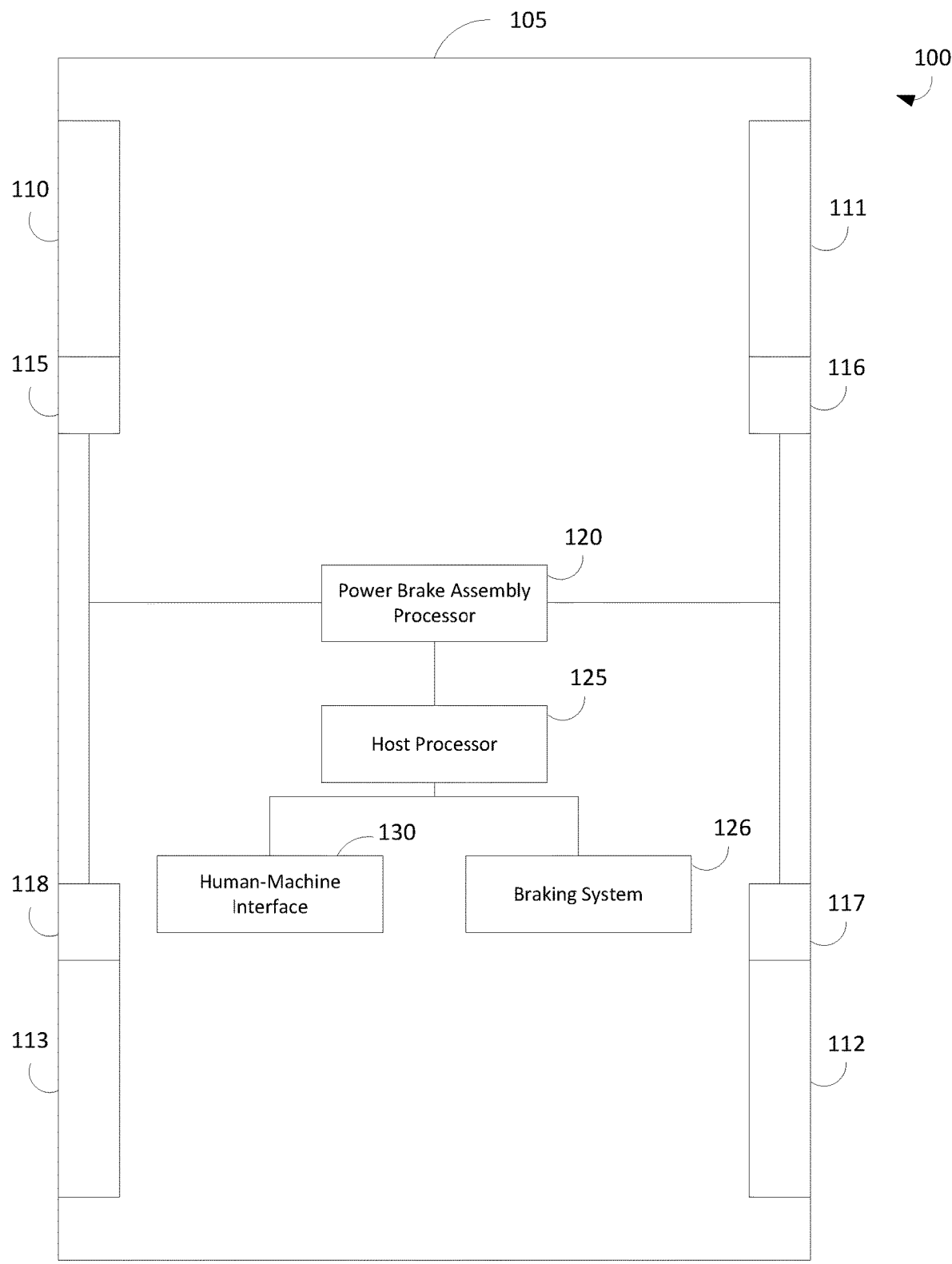
FIG. 1 illustrates a vehicle according to one embodiment.

FIG. 1 illustrates a system 100 for notifying a driver of a vehicle 105 of a number of hydraulic pressure support events according to one embodiment. The vehicle 105 may be an automobile, a truck, a motorcycle, a tractor-trailer, or other kind of vehicle. While the vehicle 105 is illustrated with four wheels 110-113, it is to be understood that the vehicle 105 may include a greater or lesser number of wheels.

The system 100 includes parking brake assemblies 115-118 for each of the wheels 110-113. The parking brake assemblies 115-118 include components that, when actuated, are configured to slow the vehicle 105 or secure the vehicle 105 when it is parked. These components may include brake calipers, brake rotors, brake pads, cylinders, a brake pump configured to build pressure in one or more cylinders, and a pump motor that, when actuated, builds the pressure in the cylinders via the brake pump.

The parking brake assemblies 115-118 are electrically connected to a parking brake electronic processor 120, which is configured to generate commands to actuate the brake components of the parking brake assemblies 115-118. As noted above, the components of the parking brake assemblies 115 may be mechanically actuated (for example, via an electric motor driving calipers and brake pads that are applied to a brake disc) or hydraulically actuated (for example, hydraulic pressure driving calipers and brake pads that are applied to a brake disc) based on the commands generated by the parking brake electronic processor 120. The parking brake electronic processor 120 may include a microprocessor, an application-specific integrated circuit ("ASIC"), or another appropriate control circuit. The parking brake electronic processor 120 may also include a communication interface circuit, which allows the power braking assembly processor 120 to communicate with external electrical components, such as electrical brake components of the parking brake assemblies 115-118, of the system 100 wirelessly or by wired connection.

The system 100 also includes a host electronic processor 125 (or host processor). The host processor 125 is configured to, among other things, perform the methods and functions described herein. Like the parking brake electronic processor 120, the host processor 125 may include a communication interface circuit, which allows the host processor 125 to communicate with external electrical components (for example, the parking brake electronic processor 120) of the system 100 wirelessly or by wired connection. The host processor 125 is also configured to generate commands which are provided to the parking brake electronic processor 120 to actuate the parking brake assemblies 115-118. The host processor 125 is, in one embodiment, a processor configured to control an electronic stability program ("ESP") for a vehicle. The ESP helps to improve the stability of the vehicle by, for example, controlling a braking system of the vehicle 105, controlling an anti-lock braking system of the vehicle 105, and the like. The ESP is designed to detect loss of stability (e.g., loss of steering control) and then actuate components of the various other vehicle systems to help a driver control the vehicle 105. For example, the ESP is used to prevent vehicle instability by generating commands to individually actuate vehicle brakes or actuate vehicle brakes in a coordinated manner.

The host processor 125 also includes a non-transitory, computer-readable memory that includes, among other things, instructions for executing the methods and functions described herein. The memory also includes a counter that, when a hydraulic pressure support event is requested, is incremented. The memory also includes stored thresholds to compare the counter to, as described below.

The host processor 125 is electrically connected to various vehicle systems of the vehicle, such as a braking system 126. The braking system 126 includes, much like the parking brake assemblies 115-118, various components for slowing the vehicle 105 and/or securely stopping the vehicle 105. Among these components is a brake pump, which builds hydraulic pressure in a cylinder to apply brake components to one or more of the wheels 110-113. Hydraulic pressure is built in the cylinder by a pump motor receiving a voltage from the host processor 125. Hydraulic pressure is built by the brake pump based on the received voltage.

In some embodiments, the host processor 125 and the parking brake processor 120 are two separate processors. However, in other embodiments, the two processors may be combined on one computer chip or other appropriate processing circuit board.

The host processor 125 is also electronically connected to a human-machine interface 130. The human-machine interface 130 includes a device or group of devices that allows a driver of the vehicle 105 to interact with the system 100. For example, the human-machine interface 130 may include a touch screen, a display, a speaker, and other components. The human-machine interface 130 provides notifications to the driver.

Figure 2:
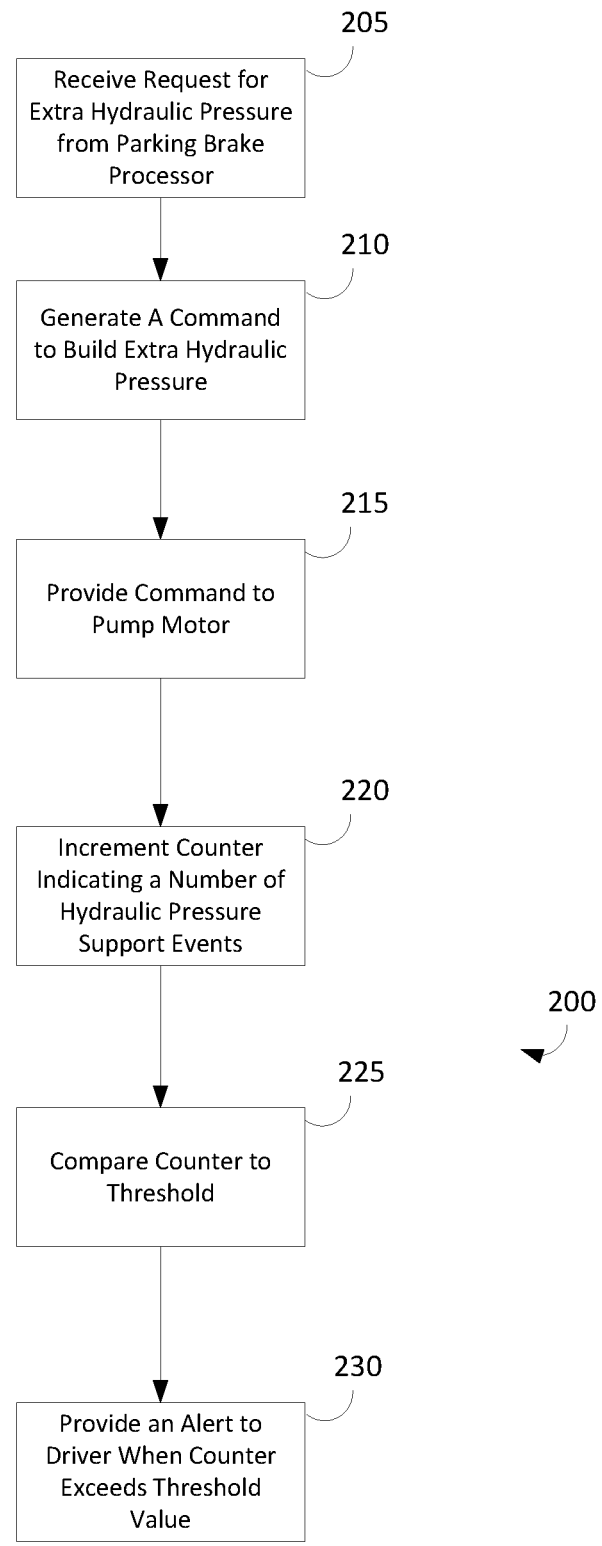
FIG. 2 illustrates a method for notifying a driver of a number of hydraulic pressure support events according to one embodiment.

FIG. 2 illustrates a method 200 for notifying a driver of a number of hydraulic pressure support events according to one embodiment. The method 200 includes receiving, at the host processor 125, a request for extra hydraulic pressure at one or more of the parking brake assemblies 115-118 from the parking brake processor 120 (block 205). The parking brake processor 120 requests extra hydraulic pressure (a hydraulic pressure support event) in response to various driving situations for the vehicle 105. For example, if the vehicle 105 is an autonomous vehicle, the parking brake processor 120 may request a hydraulic pressure support event whenever the vehicle 105 is parked, as there is no human driver to ensure the parking brake assemblies 115-118 are properly securing the vehicle 105. In another embodiment, the parking brake processor 120 and/or the host processor 125 receives a current grade of inclination of a driving surface from an inertial sensor. If the inertial sensor indicates that the current grade of inclination is greater than a particular value, when, for example, the vehicle 105 is being parked, the parking brake processor 120 sends a request for extra hydraulic pressure to the host processor 125.

The method 200 also includes generating, with the host processor 125, a command to build extra hydraulic pressure at one of the parking brake assemblies 115-118 using the pump motor (block 210). The command is generated when a driver of the vehicle 105 requests braking force by, for example activating a parking brake of the vehicle 105. In some embodiments, the command indicates an amount of hydraulic pressure support that is equal to a difference between a current pressure and a driver-requested brake force (such as from the request to apply a parking brake). In some embodiments, the amount of hydraulic pressure support is a discrete, pre-determined value. In other embodiments, the amount of hydraulic pressure support is determined based upon a current grade of inclination of the driving surface or other values (for example, vehicle type, vehicle category, brake system configuration, and hydraulic system load).

The method 200 also includes providing, with the host processor 125, the command to the pump motor (block 215). The pump motor of the braking system 126 receives the command and activates a brake pump to increase hydraulic pressure at one or more of the parking brake assemblies 115-118 to, for example, slow down the vehicle 105 or secure the vehicle 105 while it is parked.

The method 200 also includes incrementing, with the host processor 125, the counter in the memory when the hydraulic pressure support is provided (block 220) and then comparing, with the host processor 125, the counter to a threshold value (225).

The threshold value may be a preset value stored in the memory and may be set based upon vehicle type, vehicle category, brake system configuration, hydraulic system load, hardware profile, and other factors. In some embodiments, there are multiple threshold values stored in the memory and the counter is compared to each of the threshold values.

Figure 3:
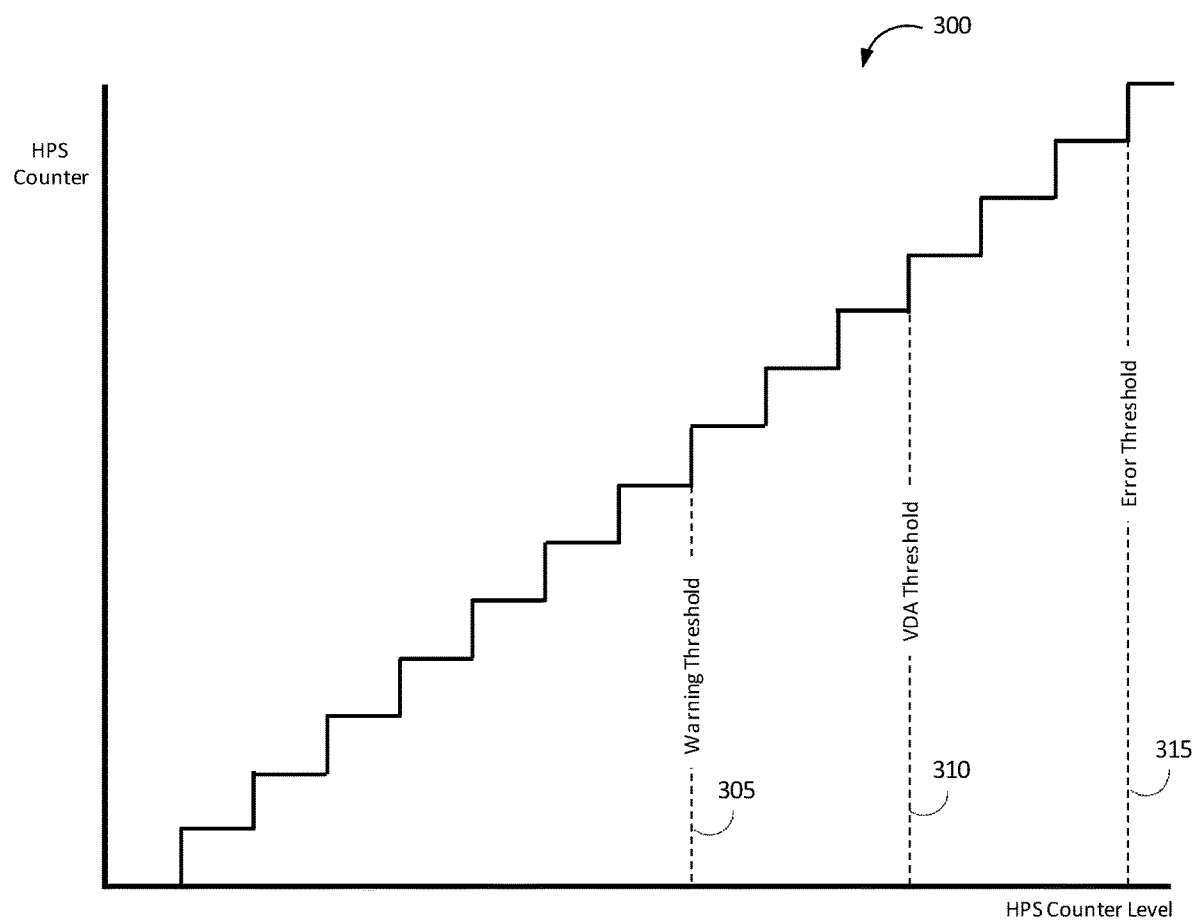
FIG. 3. is a graph illustrating different thresholds values according to one embodiment.

Example threshold values are illustrated in the graph 300 in FIG. 3. As the number of hydraulic pressure support events increases, the counter is incremented. At different threshold levels, such as a warning threshold 305, a Verband der Automobilindustrie ("VDA") threshold 310, and an error threshold 315. In one embodiment, the warning threshold 305 is eight hundred hydraulic pressure support events, the VDA threshold 310 is one thousand hydraulic pressure support events, and the error threshold 315 is one thousand two hundred hydraulic pressure support events.

If the counter passes any of these thresholds, an alert is provided to the driver of the vehicle 105 (block 230) through the human-machine interface 130. If the warning threshold 305 is passed, a single notification is provided, for example, on a touch screen or display indicating that the threshold has been passed. The alert may simply be text that is displayed every time that a hydraulic pressure support event occurs.

If the counter exceeds the VDA threshold 310, the alert may be continuously displayed on the human-machine interface 130 and a diagnostic trouble code ("DTC") or other trouble code may be displayed to the driver of the vehicle 105. The alert may also indicate that potential host processor 125 replacement is needed. Additionally, if a trouble code is generated, it may be stored in the memory. If the error threshold 315 is passed, the human-machine interface 130 may continuously flash the alert text (along with the DTC) and an audible sound, such as a chime, may be made in addition to the displayed alert text. The alert may also indicate that the host processor 125 must be replaced. Additionally, certain features of the vehicle 105 may be disabled, such as autonomous parking functions and features.

In some embodiments, the alert also includes suggestions for desired driver actions in response to the thresholds being passed. For example, if the warning threshold 305 or the VDA threshold 310 is passed, the alert may also indicate "avoid parking on steep grades." If the error threshold 315 is passed, the alert may also indicate "take vehicle in for service."

Thus, embodiments described herein provide, among other things, systems and methods for notifying a driver of a number of hydraulic pressure support events. Various features, advantages, and embodiments are set forth in the following claims.

What is claimed is:

1. A system for notifying a driver of a number of hydraulic pressure support events, the system including
a parking brake assembly;
a human-machine interface;
a parking brake electronic processor configured to generate a command to apply one or more braking components of the parking brake assembly to at least one wheel of the vehicle and generate a request for additional hydraulic pressure support; and
a host electronic processor configured to
receive the request for additional hydraulic pressure support from the parking brake electronic processor;
generate a command to build extra hydraulic pressure at the at least one wheel using a pump motor of a braking system of the vehicle;
provide the command to the pump motor;
increment a count of a counter for each occurrence of a hydraulic pressure support event. wherein the counter indicates a number of hydraulic pressure support events performed;
compare the counter to a threshold value; and
provide an alert to the driver via the human-machine interface when the counter exceeds the threshold value.

2. The system of claim 1, wherein the host electronic processor is further configured to store a trouble code when the threshold value is exceeded.

3. The system of claim 1, wherein the command is generated by the host electronic processor in response to a driver of the vehicle activating a parking brake of the vehicle.

4. The system of claim 1, wherein the command generated by the host electronic processor indicates an amount of hydraulic pressure support that is equal to a difference between a current pressure and a driver-requested brake force.

5. The system of claim 4, wherein the amount of hydraulic pressure support is determined based on a current grade of inclination of a driving surface of the vehicle.

6. The system of claim 1, wherein the host electronic processor is further configured to
compare the counter to a plurality of threshold values, and
provide an alert to the driver via the human-machine interface when the counter exceeds each one of the plurality of threshold values.

7. The system of claim 6, wherein the plurality of threshold values include a warning threshold and an error threshold.

8. The system of claim 1, wherein the host electronic processor is further configured to provide a text alert to the driver via the human-machine interface when the counter exceeds the threshold value.

9. The system of claim 1, wherein the host electronic processor is further configured to continuously display the alert via the human-machine interface and a diagnostic trouble code when the counter exceeds the threshold value.

10. The system of claim 1, wherein the alert further includes suggestions for desired driver actions in response to the counter exceeding the threshold value.

11. A method for notifying a driver of a number of hydraulic pressure support events, the method including
receiving, via a host electronic processor, a request for additional hydraulic pressure support from a parking brake electronic processor of a vehicle;
generating, via the host electronic processor, a command to build extra hydraulic pressure at the at least one wheel of the vehicle using a pump motor of a braking system of the vehicle;
providing, via the host electronic processor, the command to the pump motor;
incrementing, via the host electronic processor, a count of a counter for each occurrence of a hydraulic pressure support event, wherein the counter indicates a number of hydraulic pressure support events performed;
comparing, via the host electronic processor, the counter to a threshold value; and
providing, via a human-machine interface, an alert to a driver of the vehicle when the counter exceeds the threshold value.

12. The method of claim 11, further including storing, via the host electronic processor, a trouble code when the threshold value is exceeded.

13. The method of claim 11, wherein the command is generated, via the host electronic processor, in response to a driver of the vehicle activating a parking brake of the vehicle.

14. The method of claim 11, wherein the command generated, via the host electronic processor, indicates an amount of hydraulic pressure support that is equal to a difference between a current pressure and a driver-requested brake force.

15. The method of claim 14, wherein the amount of hydraulic pressure support is determined based on a current grade of inclination of a driving surface of the vehicle.

16. The method of claim 11, further comprising
comparing, via the host electronic processor, the counter to a plurality of threshold values, and
providing, via the host electronic processor, an alert to the driver via the human-machine interface when the counter exceeds each one of the plurality of threshold values.

17. The method of claim 16, wherein the plurality of threshold values include a warning threshold and an error threshold.

18. The method of claim 11, wherein providing the alert to the driver via the human-machine interface when the counter exceeds the threshold value includes a text alert displayed via the human-machine interface.

19. The method of claim 11, further including continuously displaying, via the human-machine interface, the alert and a diagnostic trouble code when the counter exceeds the threshold value.

20. The method of claim 11, wherein the alert further includes suggestions for desired driver actions in response to the counter exceeding the threshold value.

* * * * *